United States Patent [19]

Simpson et al.

[11] 4,089,645

[45] May 16, 1978

[54] PROCESS FOR DYEING POLYMER SUBSTRATES

[75] Inventors: Vernon P. Simpson, Lewiston; Alma L. Coats, Grand Island, both of N.Y.

[73] Assignee: Hooker Chemicals & Plastics Corp., Niagara Falls, N.Y.

[21] Appl. No.: 718,261

[22] Filed: Aug. 27, 1976

Related U.S. Application Data

[63] Continuation of Ser. No. 550,304, Feb. 18, 1975, abandoned, which is a continuation-in-part of Ser. No. 367,914, Jun. 7, 1973, abandoned.

[51] Int. Cl.$^2$ .................... D06P 1/673; D06P 5/22
[52] U.S. Cl. .................................................. 8/4; 8/31; 8/162 B; 8/168 R; 8/168 D; 8/171; 260/40 P; 260/42.21

[58] Field of Search ............... 8/171, 4, 31, 168 C, 8/168 D; 260/40 P, 42.21

[56] References Cited

U.S. PATENT DOCUMENTS

| 1,666,715 | 4/1928 | Metzger | 8/83 |
|---|---|---|---|
| 3,655,423 | 4/1972 | Lin | 428/425 |

*Primary Examiner*—Donald Levy
*Attorney, Agent, or Firm*—Peter F. Casella; William J. Crossetta, Jr.; Arthur S. Cookfair

[57] ABSTRACT

Polymer substrates particularly molded resins and polymers are dyed by pretreatment of the substrate with a phosphorus sulfide, particularly phosphorus sesquisulfide, followed by contacting the treated substrate with an aqueous dyestuff composition.

22 Claims, No Drawings

PROCESS FOR DYEING POLYMER SUBSTRATES

This is a continuation, of application Ser. No. 550,304, filed Feb. 18, 1975, now abandoned which is a continuation-in-part of Ser. No. 367,914 filed June 7, 1973, now abandoned.

FIELD OF INVENTION

The present invention relates to the dyeing of polymers. More particularly it relates to the dyeing of molded resins and polymers and especially to the dyeing of molded articles formed from reinforced polyesters which articles have superior surface smoothness, i.e., "low profile" polyester articles.

BACKGROUND OF THE INVENTION

There is a continuing demand for low cost procedures for the coloration of molded plastics, especially reinforced polyester articles in such industries as the automotive, home appliance, radio and television industries and for use in decorative containers and the like. The recent development of moldable reinforced polyester compositions characterized by little or no tendency to shrink during the curing thereof has brought with it the demand for suitable methods for the coloration of molded articles. Such polyester compositions are usually heterogeneous in nature, that is they are formulated to contain not only reinforcing materials, i.e., fiber glass and inorganic diluents such as talc, asbestos and the like, but also two or more dissimilar organic polymer materials, e.g., mixtures of unsaturated polyesters with saturated polyesters, polymethyl methacrylate, polyvinyl chloride, polystyrene or the like. On curing of the unsaturated polyester component as by cross linking with styrene or other ethylenic monomers, the dissimilar polymeric materials separate as a distinct phase giving rise to a distinctly heterogeneous polymer composition. Although on molding such polymer compositions, articles of superior surface smoothness and low shrinkage can be obtained, the heterogeneous nature of the composition creates problems in the coloration of such articles.

Thus, on attempting to color the polymer composition by conventional pigmenting procedures results in uneven coloration of the molded article due most likely to differences in the solubility or dispensibility of the pigment in the dissimilar polymers. Dyeing of these articles by conventional procedures also results in uneven colorations due to the dissimilar attraction of the polymers for the dyestuff or the dyeing procedure may result in damage to the smooth surface of the molded article.

OBJECTS OF THE INVENTION

It is an object of this invention to provide an improved process for the dyeing of polymers.

Another object is to provide an improved process for the dyeing of polyesters.

A further object is to provide an improved process for the dyeing of reinforced polyester articles.

A still further object is to provide an improved process for the dyeing of molded "low profile" polyester articles.

Other objects will be apparent from the following description of the invention.

BRIEF SUMMARY OF THE INVENTION

The present invention is directed to the process which comprises the steps of (1) pretreating a polymer containing substrate with at least one low oxidation state phosphorus sulfide, i.e., wherein the phosphorus has a valence of less than 5, preferably in a solvent for the phosphorus sulfide, and (2) dyeing the pretreated substrate with an aqueous dyestuff composition the dyestuff composition consisting essentially of at least 1 part by weight of a water soluble salt of lignin sulfonate and one part by weight of a basic organic dyestuff.

Dyestuff compositions suitable for use in the process of this invention are disclosed and claimed in copending application of Alma Coats et al Ser. No. 376,649, filed July 5, 1973, now abandoned.

DESCRIPTION OF THE PREFERRED EMBODIMENT

In accordance with a preferred mode of carrying out the process of the polyester, and especially a polyester which has been cured by cross linking an ethylenically unsaturated polyester with an ethylenically unsaturated monomer, e.g., styrene, and containing a low profile additive, e.g., a saturated polyester containing terminal carboxyl groups, is contacted with an organic solvent solution of phosphorus sulfide wherein the phosphorus has a valence of less than 5, e.g., phosphorus sesquisulfide, tetraphosphorus pentasulfide and tetraphosphorus heptasulfide, thereby forming on the surface of said substrate a phosphorus sulfide coating adherently bonded thereto, and thereafter dyeing the coated substrate by contacting it with an aqueous solution of a dyestuff composition comprising at least 1 part by weight of a salt of lignin sulfonate material and one part of a water soluble basic organic dyestuff.

Typical polymers to which the process of this invention is applicable include the homopolymers and copolymers of ethylenically unsaturated aliphatic, alicyclic and aromatic hydrocarbons such as polyethylene, polypropylene, polybutene, ethylenepropylene copolymers, copolymers of ethylene or propylene with other olefins, polybutadiene; polymers of butadiene, polyisoprene, polystyrene and polymers of penene, hexene, cyclopentadiene, methylstyrene, and the like. Other polymers useful in the invention include chlorinated polypropylene and methylene; polymers of acrylate esters and polymers of methacrylate esters, acrylate and methacrylate resins such ethyl acrylate; alkyd resins; cellulose derivatives such as cellulose acetate; cellulose acetate butyrate, cellulose nitrate, ethyl cellulose; epoxy resins; isobutylene resins (polyisobutylene); isocyanate resins (polyurethanes); melamine resins such as melamineformaldehyde; phenolic resins such as phenolformaldehyde; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde; rubbers such as natural rubber, synthetic polyisoprene reclaimed rubber, chlorinated rubber, polybutadiene; polysulfides (Thiokol); urea resins; vinyl resins such as polymers of vinyl acetal; polyvinylchloride, chlorinated polyvinylchloride; polyformaldehyde; polyphenylene oxide; polymers of diallyphthalates and phthalates; polycarbonates of phosgene or thiophosgene and dihydroxy compounds such as bisphenols, thermoplastic polymers of bisphenols and epichlorohydrin (tradenamed Phenoxy polymers); graft copolymers and polymers of unsaturated hydrocarbons and an unsaturated monomer, such as graft copolymers of polybutadiene, styrene and acrylonitrile, commonly called ABS resin; ABS-polyvinylchloride polymers, recently introduced under the tradename of Cycovin; and acrylic polyvinyl chloride polymers, known by the tradename of Kydex 100.

Preferably the polymer used as the substrate is a polyester in the cured state such as the cross linked polyesters obtained from ethylenically unsaturated polyesters and an ethylenically unsaturated monomer, e.g., styrene, divinyl benzene, alpha methylstyrene, vinyl toluene, and the like. Especially preferred are the recently developed low profile polyester compositions comprising a mixture of a styrenated polyester resin and dissimilar polymer, e.g., polymethylmethacrylate, polyvinyl chloride, polystyrene, saturated polyesters and the like. Low profile polyester compositions of this class are disclosed in U.S. Pat. Nos. 3,701,748, 3,489,707, 3,711,432, 3,721,642 and copending application of Hindersinn et al, Ser. No. 260,937, filed June 8, 1972, now abandoned.

The polymer substrates can be used in the unfilled condition or with fillers such as glass fibers or mats, glass powder, asbestos, talc and other mineral fillers, wood flour, and other vegetable fillers, waxes and the like.

The polymer substrates can be in various physical forms such as shaped articles, for example moldings, sheets, rods and the like, fibers, films, and fabrics and the like of various thicknesses.

In the process of this invention the polymer substrate is first subjected to one or a mixture of low oxidation state phosphorus sulfides, preferably phosphorus sesquisulfide. In this step the phosphorus sulfide can be in the vapor or liquid state or dissolved in solvent. Preferably the phosphorus sulfide is dissolved in a solvent. Suitable solvents are those which do not detrimentally affect the surface of the polymer substrate but which may and, preferably do, having a swelling action on the surface of the substrate. Typical of such suitable solvents are halogenated hydrocarbons and halocarbons such as, chloroform, methyl chloroform, phenyl chloroform, dichloroethylene, trichlorethylene, perchlorcethylene, ethyl dibromide, ethyl chlorobromide, propylene dibromide, monochlorobenzene, monochlorotoluene and the like; aromatic hydrocarbons, benzene, toluene, xylene and the like, ketones such as acetone, methylethyl ketone and the like, acetic acid, acetic acid-trichloroethylene mixtures, carbon disulfide; and the like. The solution concentration is generally in the range of about 0.0001 weight percent of phosphorus sulfide based on the weight of the solution up to a saturated solution, preferably from about 0.1 to about 2.5 percent. Generally the temperature of this first treatment step is in the range of about 10° centrigrade to about 135° centigrade, but preferably in the range of about 25° centigrade to about 50° centigrade. The contact time varies depending upon the nature of the substrate, concentration of the phosphorus sulfide solution, temperature and depth of coloration desired, but is generally in the range of about 1 second to about 1 hour or more, preferably in the range of about 1 to about 10 minutes.

Prior to contacting the polymer substrate with the phosphorus sulfide, liquid or solution, the surface of the substrate should be clean. When a solution is used, the solvent generally serves to clean the surface. Preferably, a solvent wash to remove dirt or grime such as grease, wax, mold release agents and the like, is employed prior to contacting the substrate with the low oxidation state phosphorus sulfide liquid or solution, to improve the adhesion and quality of the resulting coating and subsequent dyeing. The temperature of the solvent wash is generally in the range of about 30° centigrade to the boiling point of the solvent used, preferably from about 50° to about 100° centigrade or higher. The contact time varies according to the condition of the substrate but preferably is from 1 to about 15 minutes.

As a result of the treatment with the low oxidation state phosphorus sulfide compound, the latter is deposited at the surface of the polymer substrate. By this is meant that it can be located at the surface of the substrate, embedded in the surface and embedded beneath the surface of the substrate. The resultant surface is thereby rendered more receptive to organic dyestuffs, particularly of the basic dyestuff class, than the untreated substrate.

Following this initial treatment or pretreatment, of the substrate, it may be rinsed with water or a suitable solvent and can be then dried by merely exposing the substrate to the atmosphere or to inert atmosphere such as nitrogen, carbon dioxide or the like, or by drying the surface with radiant heaters or in a conventional oven. Drying times can vary considerably, for example, from 1 second to 30 minutes or more, preferably from about 5 seconds to 10 minutes and more preferably 5 to 120 seconds. The rinsing and drying steps are optional.

The thus treated substrate is thereafter subjected to an aqueous solution of a basic dyestuff, preferably to a dyestuff composition comprising at least 1 part by weight of a salt of a lignin sulfonate and one part of a water soluble basic dyestuff.

The lignon sulfonate material employed in this invention is generally a water soluble alkali metal or alkaline earth metal salt of lignin sulfonic acid. Thus one can use the sodium, potassium, lithium, calcium and magnesium salts of lignin sulfonic acid or partially desulfonated lignin sulfonic acid such as those disclosed in U.S. Pat. No. 2,371,136. Many such and similar materials are well known commercially available products and are sold under various trade designations such as Marasperse N (sodium lignin sulfonate), Marasperse C (calcium lignin sulfonate), Darvan 2 (purified sodium lignin sulfonate), Polyfon H and Doxal 23 (sodium lignin sulfonate), Maratan A and Super Spruce (magnesium lignin sulfonates). Sodium lignin sulfonate because of its general availability and effectiveness is the preferred lignin sulfonate material.

Other lignin containing materials can be used also. Thus materials containing kraft lignins, soda lignins, lignite, salts of lignite, salts of Leonardites or brown coal. These materials should be water soluble and the aqueous extracts of these materials are intended for use in this invention.

The lignin sulfonates, described above, are preferred because of their general effectiveness, ready availability and relative low cost.

The water soluble basic organic dyestuffs useful in the compositions of this invention are well known in this art. Exemplary of such dyestuffs are those belonging to the following classes of dyes.

| Diarylmethanes | | | |
|---|---|---|---|
| C.I. | Basic Yellow 2 | C.I. | #41000 |
| | Basic Yellow 3 | | 41005 |
| | Basic Yellow 37 | | 41001 |
| Triarylmethanes | | | |
| C.I. | Basic Violet 1 | C.I. | #42535 |
| | Basic Violet 2 | | 42520 |
| | Basic Violet 3 | | 42555 |
| | Basic Violet 14 | | 42510 |
| | Basic Blue 1 | | 42025 |
| | Basic Blue 5 | | 42140 |
| | Basic Blue 7 | | 42595 |
| | Basic Blue 26 | | 44045 |
| | Basic Green 1 | | 42040 |
| | Basic Green 4 | | 42000 |
| Oxazines | | | |
| C.I. | Basic Blue 3 | C.I. | #51005 |
| | Basic Blue 4 | | 51004 |
| | Basic Blue 6 | | 51175 |
| | Basic Blue 12 | | 51180 |
| | Cresyl Blue BBS | | 51010 |
| | Nile Blue | | 51180 |
| Azo Dyes | | | |
| C.I. | Basic Brown 1 | C.I. | #21000 |
| | Basic Brown 2 | | 21030 |
| | Basic Brown 4 | | 21010 |
| | Basic Blue 16 | | 12210 |
| | Basic Orange 1 | | 11320 |
| | Basic Orange 2 | | 11270 |
| Acridines | | | |
| C.I. | Basic Orange 14 | C.I. | #46005 |
| | Basic Yellow 9 | | 46040 |
| Thiazoles | | | |
| C.I. | Basic Yellow 1 | C.I. | #49005 |
| Azines | | | |
| C.I. | Basic Red 2 | C.I. | #50240 |
| | Basic Violet 5 | | 50205 |
| Thiazines | | | |
| C.I. | Basic Blue 9 | C.I. | #52015 |
| | Basic Blue 24 | | 52030 |
| | Basic Green 5 | | 52020 |
| Methines | | | |

Astrazone Pink FG

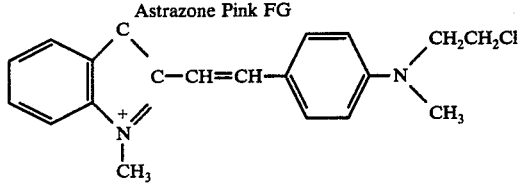

The above dyestuffs are representative of those water soluble basic dyestuffs that can be used in the preparation of the dyestuff compositions of this invention. It will be obvious that mixtures of these dyestuffs and equivalent members of these classes of organic dyes may be employed also in accordance with this invention.

In the preparation of the basic dyestuff compositions of this invention at least 1 part of the lignin sulfonate material is admixed with each part (by weight) of the water soluble basic organic dyestuff. Preferably amounts of about 5 up to 1000 parts of the lignin sulfonate material or more can be used. In general however, it is especially preferred to use from about 5 to about 500 parts of lignin sulfonate material per part of dyestuff. The amounts used will depend upon the desired intensity and/or hue of coloration desired, it being obvious that the more concentrated, with respect to the dyestuff, the composition is, the deeper the coloration obtained will be.

As indicated the compositions can be readily and conveniently prepared by the addition of the lignin sulfonate material to an aqueous solution of the dyestuff. The components can be mixed in the reverse order, that is the dyestuff either in solid or solution form can be added to the lignin sulfonate material. The resulting composition is prepared as a solution and can be stored, preferably in the absence of light, almost indefinitely. However, the composition can be converted to powder or solid form by utilizing any suitable drying procedure, e.g., spray drying, drum drying and the like.

In carrying out this dyeing step of the process of this invention an aqueous dye bath is prepared containing from about 1 to 40 parts of dyestuff composition per 100 parts by weight of water, preferably from about 5 to about 30 parts of dyestuff composition per 100 parts of water. The resulting aqueous dyestuff composition is rendered alkaline to a pH of about 9 to 12 by the addition of an alkaline agent, e.g., sodium hydroxide, sodium carbonate. The bath is then heated to about 30° to about 100° centigrade, preferably about 50° to about 80° centigrade and the pretreated polymer substrate entered into the bath. The substrate is maintained in contact with the dye liquor or bath for about 5 to 60 minutes or more, preferably about 20 to about 40 minutes. Thereafter the dyed substrate is removed from the dye bath, washed with warm (40°-60° centigrade) water and dried in air or in a warm (40°-80° centigrade) oven. The dried dyed polymer substrate can be, if desired scoured by boiling in water or dilute soap solution for about 5 to 10 minutes.

The depth of shade of the coloration produced may be varied by either controlling the dyestuff concentration of the dye bath or by controlling the time of contact of the pretreated polymer substrate with the dye bath. Thus light or pastel shades can be obtained by carrying the dyeing in dilute dye bath, e.g., dye baths containing one or two parts or less of dyestuff composition per 100 parts of water or by exposing the polymer substrate in more concentrated dye baths for relatively short times e.g., about 5 or slightly more minutes.

It is significant to note that the use of lignon sulfonate material in the process of this invention has the effect of increasing the total amount of surface area of material which may be dyed by a given amount of dyestuff, e.g. the use of about 15 to 80 or more parts lignon sulfonate per part of dyestuff, in the aqueous dyestuff composition has been found to increase the total surface area of polymer which may be dyed over that of dyestuff compositions contains less than about 15 parts lignon sulfonate material per part of dyestuff. The actual mechanism of this "increase in efficiency" is not known but it is theorized that some type of lignon sulfonate material/dyestuff complex is formed which has increased propensity of reaction with the phosphorus sulfide cites of the prepared polymer.

Depending upon the size and physical form of the polymer substrate, other means of contacting the substrate with the dye liquor can be used. Thus relatively large molded objects may be dyed by placing the object in a suitable container and circulating the dye liquor around and over the stationary object. Films, fibers and fabrics can be dyed by the conventional pad liquor, dipping, spraying and the like techniques known and practiced in the dyeing art.

The colorations produced by the process of this invention are fast to rubbing, organic solvents, alkalis, and light. The colorations produced are level, i.e., they are substantially free from the marble like effects obtained by the conventional pigmentation processes and when the substrates are dyed directly (i.e., without pretreatment with phosphorus sulfides) with organic dyestuffs. Although the colorations are essentially confined to the surface of the polymer substrate, they are permanently bonded to the surface and confer sufficient hiding powers thereto to give pleasing and uniform aesthetic effects even over such heterogeneous materials as the low profile styrenated polyesters containing dissimilar polymers, glass fibers, voids and inorganic fillers.

The following examples will illustrate the invention but are not intended to limit it. In these examples, as well as the foregoing specification and following claims all parts and percentages are by weight and temperatures are given in degrees centigrade, unless otherwise specified.

EXAMPLE I

A molded plaque, measuring 8 in. × 8 in. × ⅛ in., from the "low profile" reinforced polyester composition prepared as described in copending application Ser. No. 260,937 was solvent washed by immersion in a hot (70°) perchloroethylene bath for 2 minutes. The washed plaque was removed from the bath and dried in air for 1 minute. The plaque was then immersed in a warm (35° to 40°) solution of one percent phosphorus sesquisulfide in perchloroethylene for five minutes. The pretreated plaque was then dried in air for 1 minute following which it was immersed in aqueous dye bath containing 20 parts of a dyestuff composition containing 20 parts of sodium lignin sulfonate and one part of Brilliant Cresyl Blue, Colour Index Number 51010, and 80 parts of water, to which sufficient aqueous caustic soda had been added to adjust the pH of the bath to about 11.0. The bath was heated to and maintained at about 75° for 30 minutes. During this period the bath was agitated intermittently. The dyed plaque was removed from the bath and rinsed in warm water and then dried in a circulating air oven at 75° for 20 minutes. The dyed plaque was colored a deep level shade of green and was free from mottled effects. On boiling in water for 5 minutes there was substantially no bleeding of dye into the water.

EXAMPLE II

A portion, measuring 3 in. by 2 in. of polypropylene split film was solvent washed by immersion in warm (50°) perchloroethylene for 2 minutes. The washed film was removed from the bath and dried in air for 1 minute. The film then was immersed in a warm (35°) solution of one percent phosphorus sesquisulfide in perchloroethylene for 5 minutes. The pretreated film was dried in air for 6 minutes and then immersed in an aqueous dye bath containing 20 parts of sodium lignin sulfonate, 1 part of Sevron Orange, 500 parts of water and sufficient caustic soda to adjust the pH of the bath to about 10.0. The film was held in the dyebath at about 35° to 40° for 30 minutes, stirring the bath intermittently. Thereafter the dyed film was rinsed in hot water and dried in a 75° oven for 10-15 minutes. The deep orange colored polypropylene film was fast to boiling water, i.e., the dyed film could be held in boiling water for 5 minutes without noticeable bleed of the dye into the hot water bath.

By repeating the above dyeing procedure but omitting the pretreatment with phosphorus sesquisulfide, only a very slight staining of the polypropylene film occurred.

EXAMPLE III

In a similar manner a 3 in. × 2 in. portion of polyvinyl chloride film was solvent rinsed in perchloroethylene for 2 minutes dried in air for one minute and then pretreated by immersion in a warm (35°) 1% phosphorus sesquisulfide-perchloroethylene solution for 5 minutes. The film was dried in air for 6 minutes and dyed in an alkaline (pH 10.0) aqueous dyebath containing 20 parts of sodium lignin sulfonate, one part of Victoria Blue B dissolved in 500 parts of water. The dyeing was accomplished in 30 minutes at 65°. The film was dyed a medium blue shade which was fast to boiling water.

EXAMPLE IV

A molded polybutene plaque, measuring 3 in. × 2 in. × ⅛ in., was pretreated by immersion in a warm (45°) 1 percent phosphorus sesquisulfide-perchloroethylene solution for 5 minutes. The plaque was dried in air for 6 minutes and then dyed by immersion in an alkaline (pH 10.0) aqueous dyebath containing 20 parts of sodium lignin sulfonate, one part of Auramine O dissolved in 500 parts of water. The dyeing was effected at 70° for 30 minutes. The dyed plaque was rinsed in warm water and dried in a 75° oven for 5 minutes. The polybutene plaque was dyed a pastel yellow shade which was fast to hot water.

EXAMPLE V

A portion of solid amber colored polyurethane sheet, measuring 3 in. × 3 in. × ¼ in., was solvent washed in hot (65°) perchloroethylene for 2 minutes. The washed sheet was air dried for 1 minute and then pretreated by immersion in a warm (35°) one percent phosphorus sesquisulfide-perchloroethylene solution for 5 minutes. The pretreated polyurethane was dried in air for 6 minutes and then dyed by immersion in an alkaline (pH 10.0) aqueous dyebath containing 20 parts of sodium lignin sulfonate and one part of Brom Cresol Blue dissolved in 500 parts of water. The dyeing was carried out at 75° for 30 minutes. The dyed sheet was rinsed with warm water and dried in a 75° oven for 10 minutes. The deep bluish black dyed polyurethane was fast to hot water.

EXAMPLE VI

A square molded plaque of high density polyethylene, weighing about 25 parts was solvent washed by immersion in hot (85°) perchloroethylene for about 5 minutes. After drying in air for about 1 minute, the washed plaque was pretreated by dipping in a warm (40°) one percent solution of phosphorus sesquisulfide in perchloroethylene for 5 minutes. The pretreated plaque was dyed a bright orange shade by immersing it in an alkaline (pH 10.0) aqueous dyebath containing about 20 parts of sodium lignin sulfonate and one part of Acridine Orange dissolved in 500 parts of water at 80° for 30 minutes. The dyed plaque was rinsed with hot water and dried in a 75° oven for 30 minutes. The dyed plaque was fast to boiling water.

EXAMPLE VII

A blow molded low density polyethylene bottle was solvent washed by immersion in hot (70°) perchloroethylene for 2 minutes and thereafter it was dried in air for about 1 minute. The bottle was pretreated by immersion in a warm (35°) one percent solution of phosphorus sesquisulfide in perchloroethylene for 5 minutes. The pretreated bottle was dyed a pale orange shade by immersion in an alkaline (pH 10.0) aqueous dyebath containing 20 parts of sodium lignin sulfonate and one part of Acridine Orange dissolved in 500 parts of water. The dyed bottle was rinsed in hot water and dried in 75° oven for 10 minutes. The dyed bottle was fast to hot water.

EXAMPLE VIII

A molded household mixer housing formed from ABS polymer (Marbon GSM) and weighing about 75 parts was solvent washed by immersion in hot (70°) perchloroethylene for about 2 minutes. The washed housing was air dried for about 1 minute and then pretreated by immersion for 5 minutes in a warm (35°) one percent solution of phosphorus sesquisulfide in perchloroethylene. After being dried in air for about 6 minutes, the housing was dyed by immersion for 30 minutes in a hot (75°) alkaline (pH 10.0) aqueous dyebath containing 20 parts of sodium lignin sulfonate and one part of Brilliant Cresyl Blue in 500 parts of water. The deep blue colored housing was rinsed with hot water and then dried in a 75° oven for 10 minutes. The dyed housing was fast to boiling water.

The invention has been described in the above specification and specific embodiments have been illustrated in the examples which serve to further illustrate the invention but are not intended to limit it. As will be obvious to those skilled in the art, various changes and modifications can be made without departing from the scope or spirit of the invention.

We claim:

1. The process of dyeing polymer substrates which comprises the steps of
   (a) treating a polymer substrate with a low oxidation state phosphorus sulfide from the group consisting of phosphorus resquisulfide, tetraphosphorus pentasulfide and tetraphosphorus hept a sulfide to deposit at the surface of said substrate a coating of said low oxidation state phosphorus sulfide, and
   (b) dyeing the thus treated polymer substrate by contacting it with an aqueous liquor comprising a basic organic dyestuff.

2. The process of claim 1 wherein the aqueous liquor of a basic organic dyestuff comprises at least one part by weight of a salt of lignin sulfonate and one part of a basic organic dyestuff.

3. The process of claim 2 wherein the polymer substrate is treated with an organic solvent solution of the low oxidation state phosphorus sulfide.

4. The process of claim 3 wherein the phosphorus sulfide is phosphorus sesquisulfide.

5. The process of claim 4 wherein the solvent solution of phosphorus sesquisulfide contains from about 0.1 weight percent to about 2.5 weight percent of said phosphorus sesquisulfide.

6. The process of claim 4 wherein said organic solvent is perchloroethylene.

7. The process of claim 2 wherein the polymer substrate is a polyester.

8. The process of claim 7 wherein the polyester is a crosslinked polyester obtained from an ethylenically unsaturated polyester and an ethylenically unsaturated monomer.

9. The process of claim 8 wherein the polyester comprises a dissimilar polymer selected from the group consisting of polymethylmethacrylate, polyvinyl chloride, polystyrene and a saturated polyester.

10. The process of claim 9 wherein the dissimilar polymer is a saturated polyester.

11. The process of claim 10 wherein the saturated polyester is a carboxyl group terminated saturated polyester.

12. The process of claim 9 wherein the polyester contains fillers.

13. The process which comprises the steps of
    (1) Solvent washing a molded polyester article comprising a mixture of an ethylenically unsaturated polyester which has been cross limked with styrene and a saturated polymer containing terminal carboxyl groups,
    (2) pretreating said article with a perchloroethylene solution of phosphorus sesquisulfide, and
    (3) dyeing said pretreated article in an aqueous dyebath containing a water soluble basic organic dyestuff.

14. The process of claim 13 wherein the aqueous dyebath contains at least one part by weight of a water soluble lignin sulfonate per part of a water soluble basic organic dyestuff.

15. The process of claim 14 in which the aqueous dyebath contains about 20 parts of said lignin sulfonate per part of said dyestuff.

16. The process of claim 14 wherein said lignin sulfonate is a sodium lignin sulfonate.

17. The process of claim 14 wherein said dyebath is an alkaline aqueous dyebath.

18. The process of claim 17 wherein said dyebath has a pH of from about 9 to 12.

19. The process of claim 1 wherein the polymer substrate is polypropylene.

20. The process of claim 1 wherein the polymer substrate is polyethylene.

21. The process of claim 1 wherein the polymer substrate is a graft copolymer of polybutadiene, styrene and acrylonitrile.

22. The process of claim 1 wherein the polymer substrate is polyvinyl chloride.

* * * * *